UNITED STATES PATENT OFFICE.

KARL STREITWOLF, OF FRANKFORT-ON-THE-MAIN, AND JULIUS HALLENSLEBEN, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY.

COMPLEX METALLIC ARSENOBENZENE COMPOUNDS AND PROCESS OF MAKING SAME.

No Drawing. Application filed March 19. 1924, Serial No. 700,424, and in Germany April 9, 1923.

We have found that complex metallic compounds of the arsenobenzenes can be obtained by combining arseno-benzenes, substituted in the amino group by an oxygen-stituted containing residue, such as $NHCH_2COOH$ or $NHCH_2SO_2H$, $NHCH_2SO_3H$, $NHCO_2Na$, $NHCH_2.CHOH.CH_2OH$, $NHSO_3H$ or the like in neutral and alkaline solution with the oxides, the hydroxides of metals such as copper, silver, gold etc. The compounds thus obtained which are soluble in water to a neutral solution possess a very good stability particularly against the influence of carbonic acid and have like the known metallic arsenobenzene compounds prepared by other processes, an excellent trypanocide action. The compounds constitute brown to brownish black bodies which are soluble in water to a clear solution and stable against the influence of carbonic acid.

The following examples illustrate our invention:

1. 4,00 g. of silver nitrate are converted into AgOH. This silver hydroxide, after being well washed, is suspended in a small quantity of water and introduced into a solution of 15. g. of a formaldehyde-sulfoxylate compound of dihydroxydiaminoarsenobenzene in 30 ccm. of water. Thus a deep black solution is obtained which is precipitated by adding alcohol. The resulting product gives a clear solution in water.

2. 0,83 g. of auric hydroxide $(Au(OH)_3)$ are triturated with a small quantity of water and introduced into a solution of 2,25 g. of a formaldehyde-sulfoxylate compound of the dihydroxydiaminoarsenobenzene in 10 ccm. of water. The gold goes slowly into solution at ordinary temperature and more rapidly when heated. This solution is filtered and the filtrate is precipitated by adding absolute alcohol and dried. The product gives a clear solution in water.

3. Cupric hydroxide $(Cu(OH)_2)$ obtained from 4 g. of $CuCl_2$ are introduced, while excluding air and stirring, into a concentrated aqueous solution of 12 g. of a formaldehyde-sulfoxylate compound of the diaminodioxy-arsenobenzene. The cupric hydroxide is completely dissolved by the last-mentioned compound. The clear solution is then introduced into a mixture of alcohol and ether. The copper salt precipitates in the form of a yellowish powder and is then filtered off, also while excluding air. The residue remaining on the filter is washed with alcohol and ether, dried by suction as far as possible and then completely dried in a good vacuum. The dry precipitate forms a reddish-brown, water-soluble powder. The addition of an alkali does not alter the solution and the addition of ammonium sulfid produces a precipitate only after some time.

4. 5,26 g. of the sodium salt of arsenophenylglycine

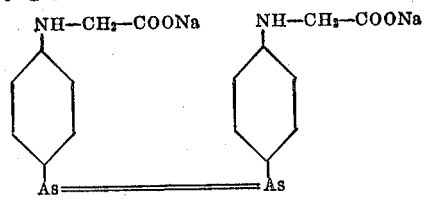

are dissolved in 50 ccm. of water. To this solution are added 1,25 g. of AgOH obtained from 1,7 g. of silver nitrate. The silver hydroxide very soon dissolves. After being dissolved, it is filtered and the new compound is precipitated by adding alcohol. The new compound constitutes a brownish-black powder and is soluble in water.

5. 5,68 g. of the hydrochloride of bis-methylamino-3.3'-5.5'-tetraminoarsenobenzene

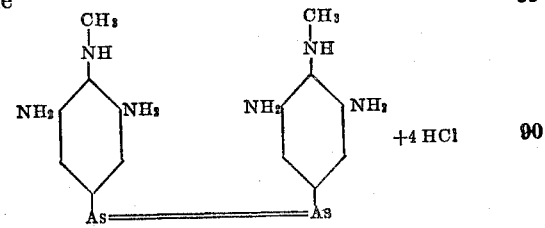

are dissolved while excluding air with 5 g. of sodium bicarbonate and 50 ccm. of water as a carbamate. The formation of the carbamate is represented by the equation

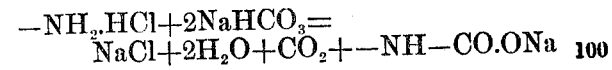

$-NH_2.HCl+2NaHCO_3=$
$NaCl+2H_2O+CO_2+-NH-CO.ONa$

To this solution are added 1,25 g. of AgOH obtained from 1,7 g. of silver nitrate. The silver hydroxide very soon dissolves and when the solution is complete, it is filtered and the silver compound is precipitated by adding alcohol. The new compound thus obtained forms a brown powder which is soluble in water.

6. 5,98 g. of the formaldehyde-bisulfite compound of 4.4'-dioxy-3.3'-diaminoarsenobenzene are dissolved in 25 ccm. of H₂O and to the solution are added 1,25 g. of AgOH obtained from 1,7 g. of silver nitrate. The silver hydroxide very soon dissolves and after filtration of this solution the new silver compound is precipitated by adding alcohol. The new compound forms a brown powder which is soluble in water.

7. 10 g. of the diformaldehyde-bisulfite compound of p-arsenophenyldimethylaminopyrazolone

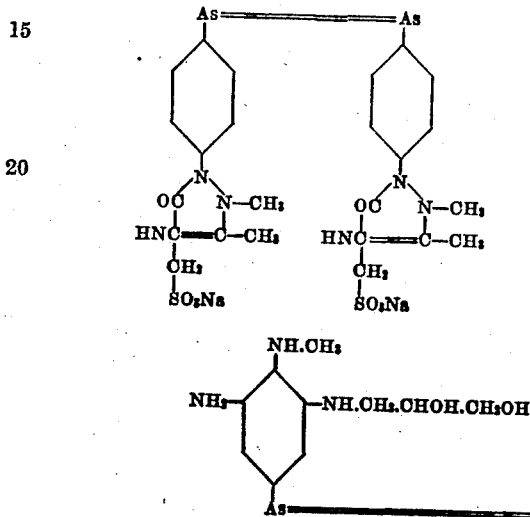

are dissolved, while stirring, in 40 ccm. of water and then silver oxide, freshly precipitated from 2 g. of silver-nitrate, is added. After the deep brown solution, which is soon formed, has been filtered, the silver preparation is precipitated therefrom by adding alcohol. It is a brown powder, soluble in water with neutral reaction.

8. 5,5 g. of arsalyte-glycide are dissolved in 20 ccm. of water and to this solution silver oxide, obtained from 1,7 g. of silver-nitrate, is added. The mixture is shaken until the whole is dissolved, it is then filtered, precipitated by adding 500 ccm. of alcohol and there are finally added 500 ccm. of ether and the precipitate is filtered by suction. The substance, after being washed with alcohol and ether and dried in vacuo, is dark-brown and soluble in water.

The composition of the arsalyte-glycide varies according to the quantity of glycide used. The formula of the diglycide is as follows:

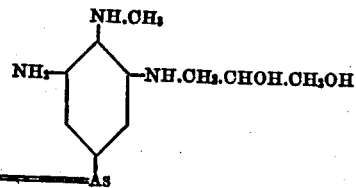

Having now described our invention, what we claim is:

1. The process of preparing complex metallic arsenobenzene compounds which comprises causing an oxygen-containing compound which is not a salt of a heavy metal of Group I of the periodic system and not a complex compound to act upon an amino-arsenobenzene which is substituted in the amino group by an oxygen-containing residue.

2. The process of preparing complex metallic arsenobenzene compounds which comprises causing silver oxide to act upon an amino-arsenobenzene which is substituted in the amino group by an oxygen-containing residue.

3. The process of preparing complex metallic arsenobenzene compounds which comprises causing silver hydroxide to act upon an amino-arsenobenzene which is substituted in the amino group by an oxygen-containing residue.

4. As new products, the arsenobenzene compounds which are substantially identical with compounds such as may be prepared by the hereindescribed process which comprises causing a compound which is not a salt of a heavy metal of Group I of the periodic system and not a complex compound to act upon an amino-arsenobenzene substituted in the amino group by an oxygen-containing residue; said products being brown to brownish-black bodies which are soluble in water to a neutral solution, possessing a very good stability and having an excellent trypanocide action.

5. As new products, the arsenobenzene compounds which are substantially identical with compounds such as may be prepared by the hereindescribed process which comprises causing silver oxide to act upon an amino-arsenobenzene substituted in the amino group by an oxygen-containing residue, said products being brown to brownish-black bodies which are soluble in water to a neutral solution, possessing a very good stability and having an excellent trypanocide action.

6. As a new product the arsenobenzene compound which is substantially identical with the compound obtained by causing silver hydroxide to act upon an amino-arsenobenzene substituted in the amino group by an oxygen-containing residue, said product being a brown to brownish-black body which is soluble in water to a neutral solution, possessing a very good stability and having an excellent trypanocide action.

In testimony whereof, we affix our signatures.

KARL STREITWOLF.
JULIUS HALLENSLEBEN.